(12) United States Patent
Maekawa et al.

(10) Patent No.: US 8,134,265 B2
(45) Date of Patent: Mar. 13, 2012

(54) MAGNETIC GENERATOR

(75) Inventors: Yoshinori Maekawa, Wako (JP);
Kazutomo Nishida, Wako (JP); Kazumi Miyashita, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/479,279

(22) Filed: Jun. 5, 2009

(65) Prior Publication Data

US 2009/0309462 A1    Dec. 17, 2009

(30) Foreign Application Priority Data

Jun. 11, 2008   (JP) .................... 2008-152482

(51) Int. Cl.
*H02K 21/24* (2006.01)
(52) U.S. Cl. .............. 310/156.12; 310/153; 310/74
(58) Field of Classification Search .......... 310/153, 310/74, 156.12, 156.13, 156.15, 156.26, 310/75 A, 75 C
See application file for complete search history.

(56) References Cited

U.S. PATENT DOCUMENTS

| | | | | |
|---|---|---|---|---|
| 4,146,806 A | * | 3/1979 | Katsumata | 310/153 |
| 4,731,554 A | * | 3/1988 | Hall et al. | 310/67 R |
| 4,841,186 A | * | 6/1989 | Feigel et al. | 310/156.12 |
| 5,118,978 A | * | 6/1992 | Matsumoto et al. | 310/153 |
| 5,214,333 A | * | 5/1993 | Kawamura | 310/153 |
| 5,500,994 A | * | 3/1996 | Itaya | 29/598 |
| 5,659,217 A | * | 8/1997 | Petersen | 310/156.26 |
| 6,891,295 B2 | * | 5/2005 | Naritomi et al. | 310/153 |

FOREIGN PATENT DOCUMENTS

JP   2007-006594 A   1/2007

* cited by examiner

*Primary Examiner* — Dang D Le
(74) *Attorney, Agent, or Firm* — Arent Fox LLP

(57) ABSTRACT

A magnetic generator, or a so-called inner-rotor generator, provided with a rotor on the inside of a stator. The rotor has a ring-shaped yoke and a magnet integrally mounted in advance to the outer circumferential surface of the yoke. The rotor is mounted to a hub spindle of a rotating body.

5 Claims, 5 Drawing Sheets

MAGNETIC GENERATOR

FIELD OF THE INVENTION

The present invention relates to a magnetic generator provided with a magnet-equipped rotor on the inside of a coil-equipped stator and, more particularly, to a small generator for a general-purpose engine.

BACKGROUND OF THE INVENTION

General-purpose engines are predominantly gasoline engines having a spark plug. A generator is provided to a general-purpose engine due to a need to supply power to a spark plug and other electrical components. Since general-purpose engines are generally small, small generators are also used, as described in Japanese Patent Application Laid-Open Publication No. 2007-6594 (JP 2007-6594 A).

FIG. 5 hereof shows a generator disclosed in JP 2007-6594 A. A generator 100 has a stator provided with a coil 102, and a rotor provided with a magnet 101 which rotates relative to the stator. A flywheel 104 is mounted to an end of a crankshaft 103. The flywheel 104 has a hub spindle 105 fitted to the tapered part of the crankshaft 103, a disk part 106 extended radially outward from the hub spindle 105, and an outer-mass part 107 formed integrally with the outer circumference of the disk part 106. Since the outer-mass part 107 has a large mass and is distant from the center (rotational center) of the crankshaft 103, the moment of inertia (the moment of inertia is proportional to mass×distance$^2$) is also large, and the flywheel effect is considerable.

The magnet 101 is provided to the outer-mass part 107. For this reason, the magnet 101 is a ring magnet having a large diameter. The magnet 101 is mounted to the outer-mass part 107 by holders 108, 108.

A disk-shaped iron core 111 wrapped in the coil 102 is secured to a crankcase 113 by bolts 112, 112.

When the crankshaft 103 rotates, electrical generation begins because the magnet 101 rotates relative to the coil 102.

The magnet 101 must be fitted to the outer-mass part 107 and held in place by the holders 108 on both sides. The holders 108 are needed to prevent the magnet 101 from being separated from the outer-mass part 107 by vibration. However, the magnet 101 is fitted to the outer-mass part 107 and the holder 108 is then mounted, making it more complex to mount the magnet. A complex mounting process results in a greater number of assembly steps and is undesirable. In view of this, a simplified process for mounting the magnet is needed.

The magnet 101 has a large diameter, and hence a greater mass, making the magnetic generator 100 large and heavy. Considering that the generator is attached to a small general-purpose engine, a reduction in the size and weight of the generator is sought.

SUMMARY OF THE INVENTION

It is therefore an object of the present invention to provide a small and lightweight generator in which a magnet can be easily mounted.

According to the present invention, there is provided a magnetic generator which comprises: a rotor having a rotary ring-shaped yoke and a magnet integrally mounted to an outer circumferential surface of the yoke; and a stator having a coil spaced a predetermined distance outwardly from an outer circumferential surface of the magnet.

The magnet is thus integrally formed with the yoke in advance in accordance with the present invention. The yoke can be easily secured to a rotating body such as a flywheel. For this reason, the magnet is very easy to mount. Also, the magnet is enclosed in a coil. In other words, the magnet has a small diameter since the rotor is disposed on the inside of the stator, and the main part of the rotor is the magnet. The magnet is therefore small and lightweight. It is thus possible to provide a small and lightweight magnetic generator in which a magnet can be easily mounted.

In a preferred form the generator is designed for use with a general-purpose engine while the yoke is mounted to a hub spindle of a flywheel mounted to a crankshaft. The coil may be mounted to a crankcase. The flywheel has a large outside diameter, but the hub spindle has a small diameter. Since the yoke is mounted to such a small-diameter hub spindle, the magnetic generator is small. A general-purpose engine provided with such a small magnetic generator can easily be made small and lightweight.

Preferably, the yoke has a ring-shaped flange mounted to an inner circumferential surface thereof, and the rotor is designed to be mounting to the hub spindle of the rotating body via the flange. Mounting the rotor to the rotating body is therefore simplified.

Desirably, the hub spindle has a stepped part on an end face thereof while the rotor is fitted into the stepped part of the hub spindle through a central hole formed in the flange. The movement of the rotor in a radial direction is therefore reduced by the stepped part, and the rotor can be stably mounted to the hub spindle.

The magnet may be integrally mounted in advance to an outer circumferential surface of the yoke by an adhesive. Mounting the rotor to the hub spindle is therefore simplified.

BRIEF DESCRIPTION OF THE DRAWINGS

Certain preferred embodiments of the present invention will be described in detail below, by way of example only, with reference to the accompanying drawings, in which.

DESCRIPTION OF THE PREFERRED EMBODIMENTS

Figure 1:
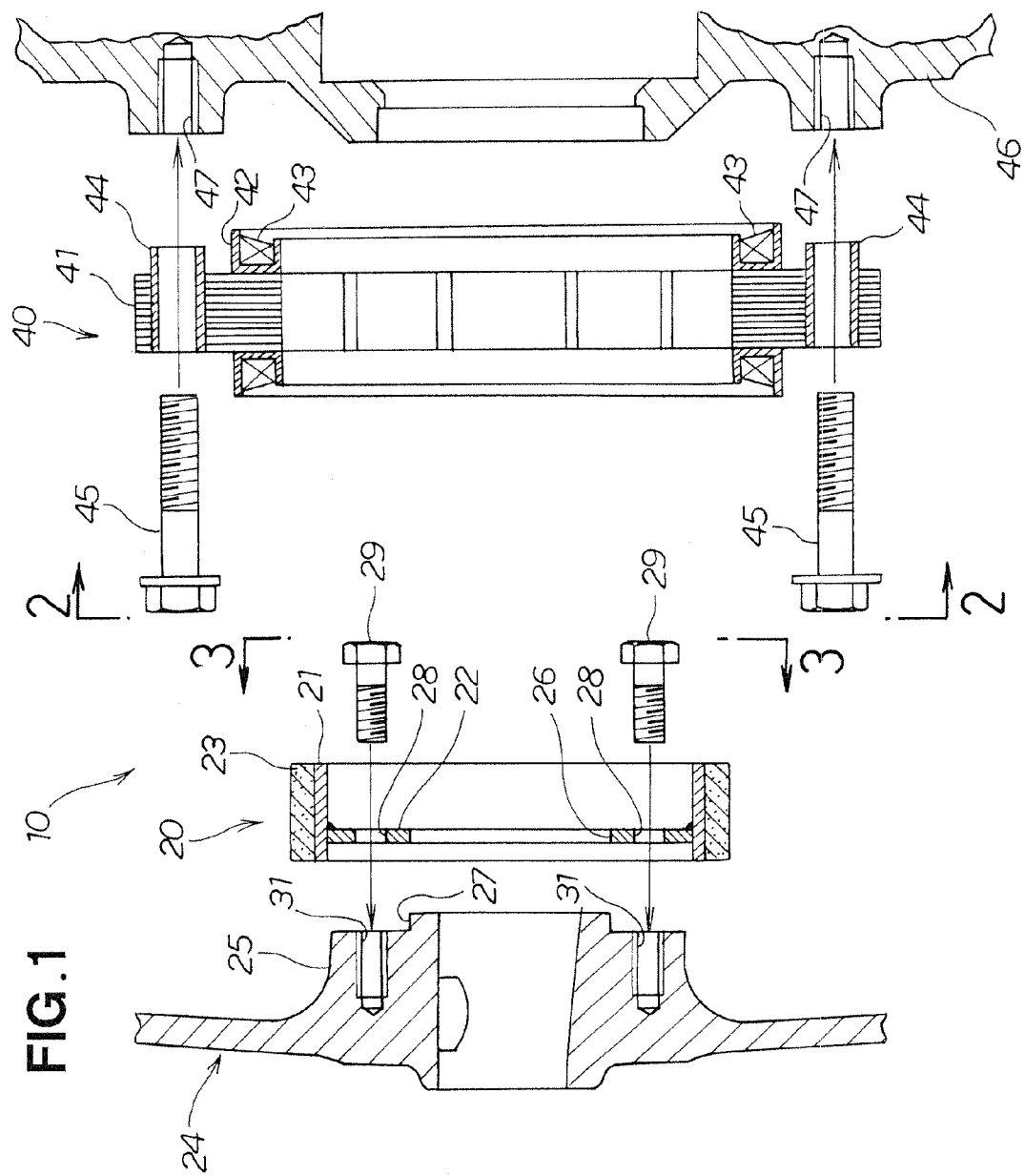
FIG. 1 is an exploded view of a magnetic generator according to an embodiment of the present invention.

As shown in FIG. 1, a magnetic generator 10 has a rotor 20 and a stator 40. The rotor 20 has an annular yoke 21, a flange 22 extending along the inner circumferential surface of the yoke 21, and a magnet 23 mounted to and integrated with the outer circumferential surface of the yoke 21 by an adhesive or the like.

A stepped part 27 corresponding to a central hole 26 of the flange 22 is formed on a hub spindle 25 of a flywheel (rotating body) 24.

The flange 22 is placed against the hub spindle 25 by fitting the stepped part 27 into the central hole 26. Bolts 29, 29 are subsequently passed through bolt holes 28, 28 of the flange 22 and are threaded into threaded parts 31, 31 provided in the hub spindle 25 of the flywheel 24, making it possible to easily mount the magnet 23 to the rotating body that is the flywheel 24.

Since the stepped part 27 is formed by machining, the diameter of the stepped part 27 can be finished with high precision. The central hole 26 of the flange 22 is also finished with high precision by machining. Merely fitting the flange 22 to the stepped part 27 allows the rotor 20 to be accurately assembled to the flywheel 24.

Since the flange 22 is fitted to the stepped part 27, the flange 22 is stably retained on the stepped part 27 even when a centrifugal force is applied to the rotor 20, and there is no concern that the rotor 20 will move in a radial direction. As a result, a constant spacing can be maintained between the outer circumferential surface of the magnet 23 and the inner circumferential surface of an iron core 41, and power can be generated as required.

The magnet 23 can be obtained, for example, by shaping a mixture of about 50 mass % of a magnetic powder and a solvent with about 50 mass % of a resin powder in a mold, drying the mixture, and subjecting the dried mixture to magnetic orientation, sintering, and magnetization. The magnetization process involves alternately aligning the north and south poles. Any method can be used to manufacture the magnet 23, and a magnet manufactured by a commonly known method can be used.

The stator 40 has a toroidal iron core 41 composed by layering a plurality of thin silicon steel sheets, a bobbin 42 mounted to hold in the iron core 41, coils 43, 43 tightly wrapped to the bobbin 42, and pipes 44, 44 mounted through the iron core 41. The stator 40 is secured to a crankcase 46, which is a stationary body, by passing bolts 45, 45 through the pipes 44, 44 and threading the bolts into threaded parts 47, 47 provided to the crankcase 46.

Figure 2:
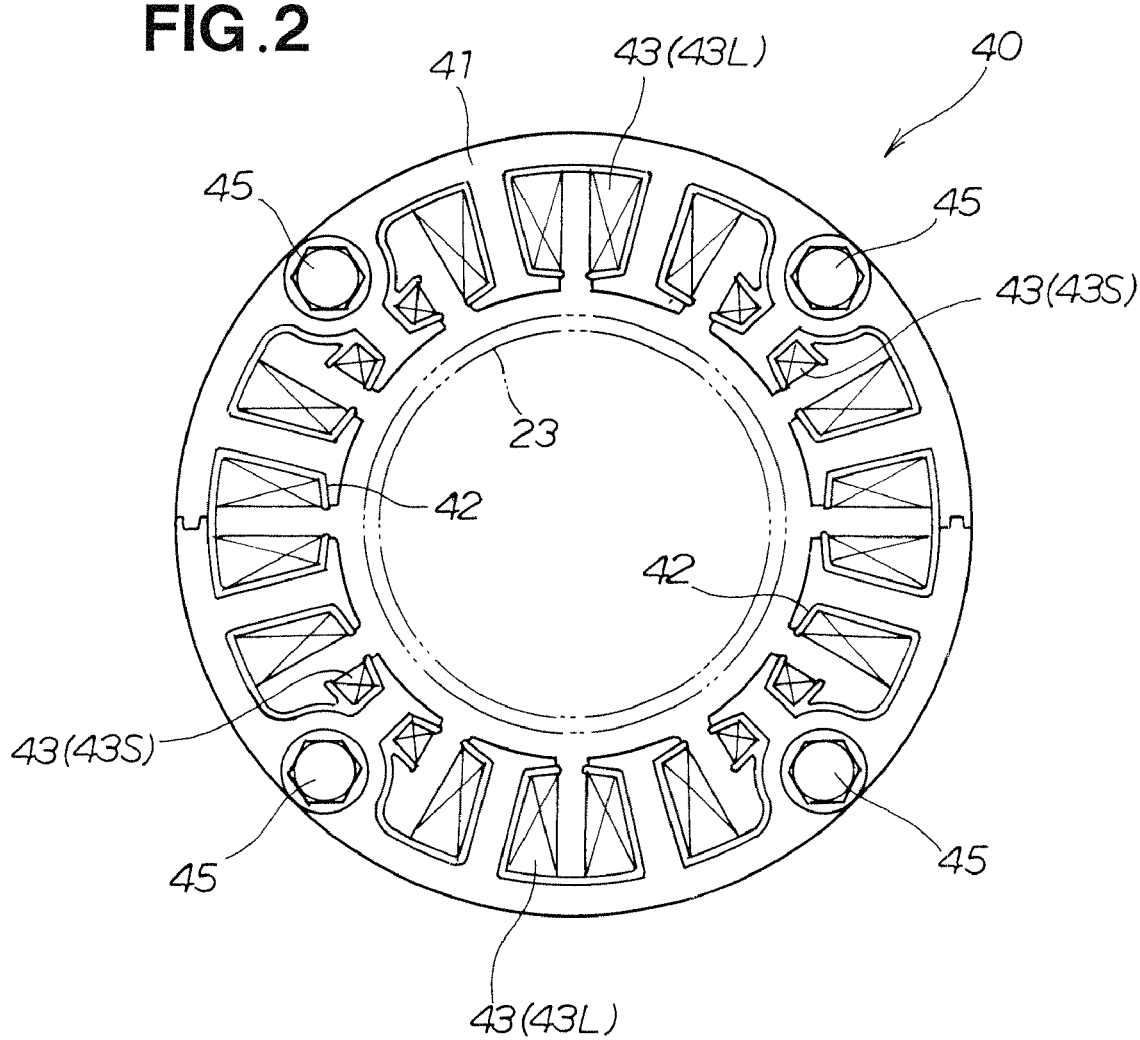
FIG. 2 is a view taken in the direction of arrowed line 2-2 of FIG. 1.

In the coil 43, twelve coils (eight large coils 43L and four small coils 43S) are aligned at a regular pitch so as to enclose the magnet 23 shown by the imaginary line in FIG. 2. The iron core 41 is secured by the four bolts 45. The magnet 23 enclosed by such an iron core 41 is sufficiently small.

Figure 3:
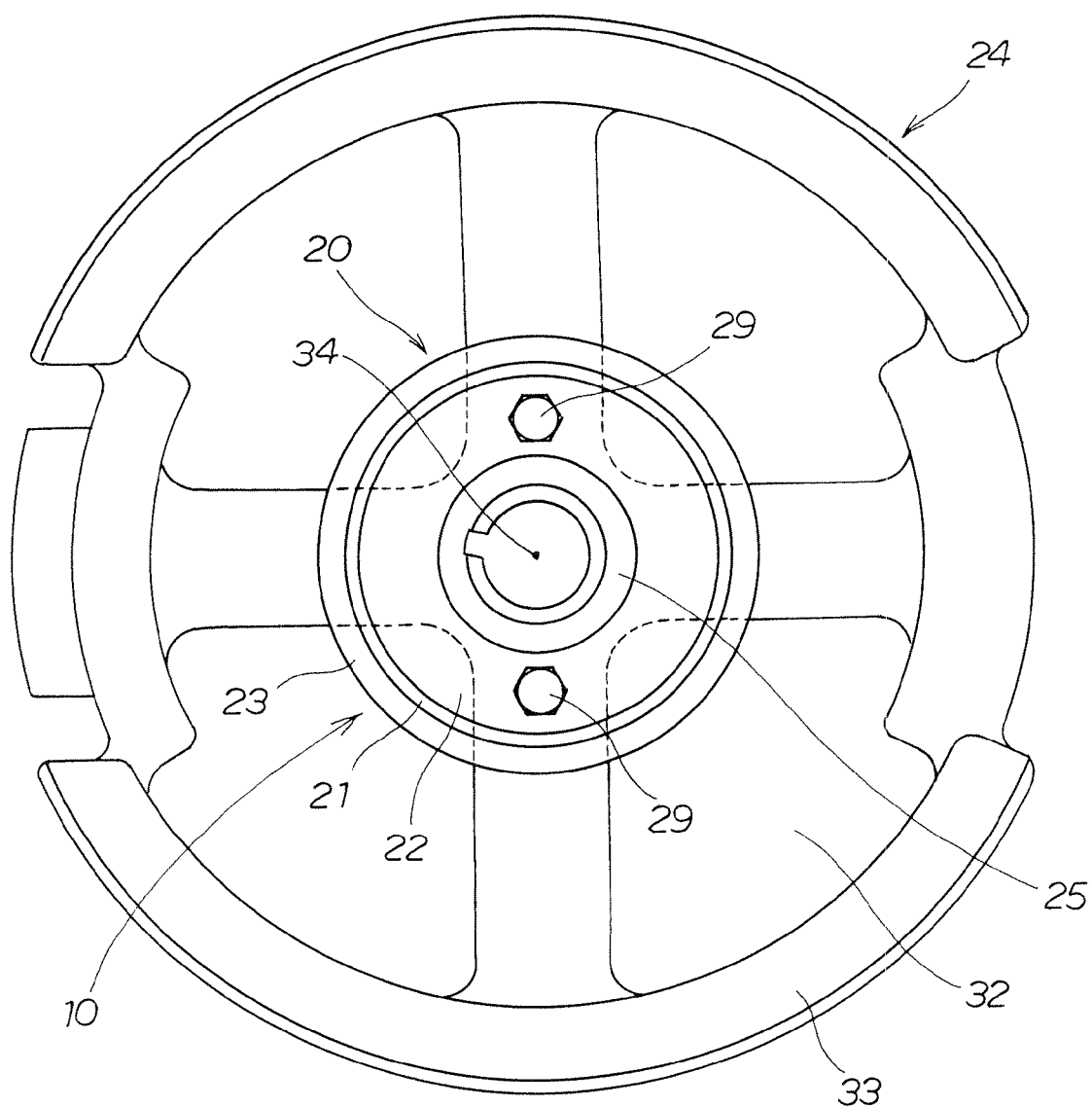
FIG. 3 is a view taken in the direction of arrowed line 3-3 of FIG. 1.

As shown in FIG. 3, the flywheel 24 has a disk part 32 extended radially outward from the central hub spindle 25, and an outer-mass part 33 integrally formed with the outer circumference of the disk part 32. Since the outer-mass part 33 has a large mass and is distant from the rotational center 34, the moment of inertia is also large and the flywheel effect is considerable.

The rotor 20 is secured by two bolts 29, 29 to the central hub spindle 25. The magnet 23 and the yoke 21, which are the main components of the rotor 20, are rings disposed so as to enclose the rotational center 34.

Figure 4:
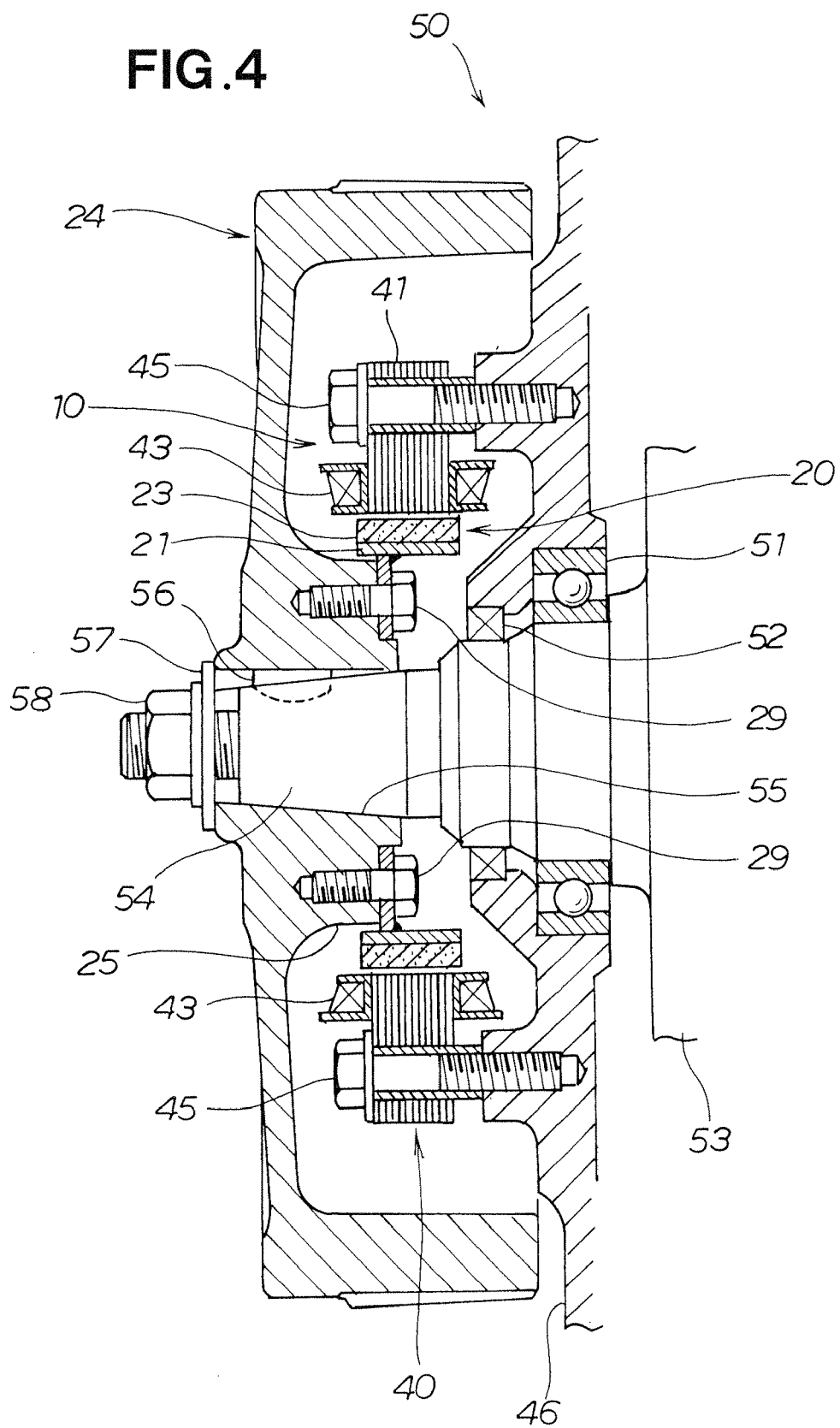
FIG. 4 is a cross-sectional view showing a manner in which the magnetic generator of FIG. 1 is mounted to a general-purpose engine.
Figure 5:
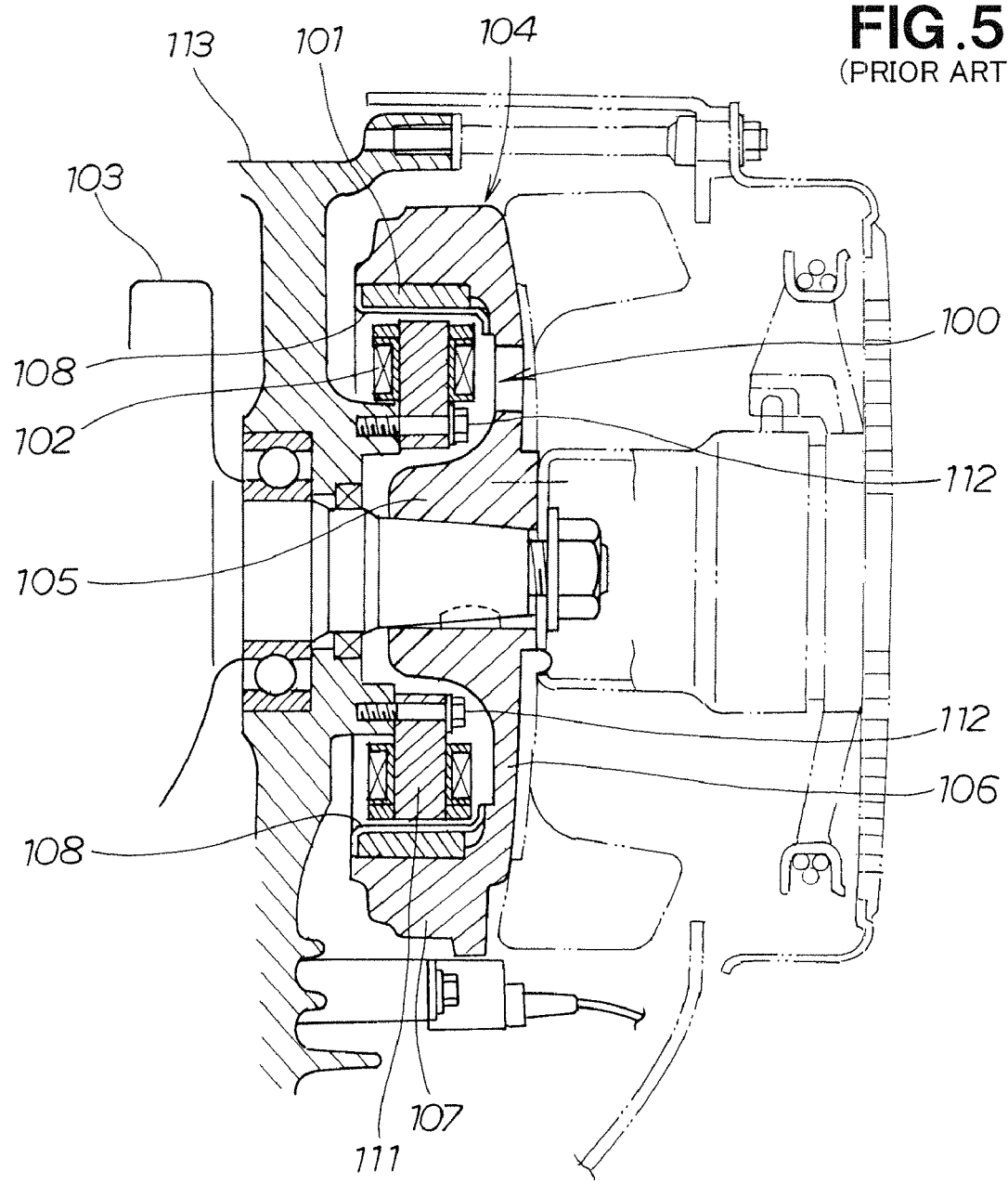
FIG. 5 is a cross-sectional view showing the arrangement of a conventional generator.

Referring to FIG. 4, a crankshaft 53 is rotatably supported in a crankcase 46 via a bearing 51 and a sealant 52 in a general-purpose engine 50, and an end of such a crankshaft 53 protrudes from the crankcase 46.

Before the flywheel 24 is mounted to the crankshaft 53, the stator 40 is secured to the crankcase 46 by bolts 45, 45. Also, the rotor 20 is secured to the flywheel 24 in advance by the bolts 29, 29.

As an essential step in fitting a taper shaft 54 to a taper hole 55 of the hub spindle 25, the flywheel 24 is mounted to the taper shaft 54. The flywheel 24 is then secured to the crankshaft 53 using a key 56, a washer 57, and a nut 58. A general-purpose engine 50 provided with a magnetic generator 10 such as the one shown in the drawing can thereby be obtained.

The flywheel 24 has a large outside diameter, but the hub spindle 25 has a small diameter. Since the yoke 21 is mounted to such a small-diameter hub spindle 25, the magnetic generator 10 is small. A general-purpose engine 50 provided with such a small magnetic generator 10 can easily be made smaller and more lightweight.

The magnet 23 is integrally formed with the yoke 21 in advance in the unit of the magnetic generator 10 as well. The yoke 21 can be easily secured to a rotating body such as the flywheel 24. For this reason, the magnet 23 is very easy to mount. The magnet 23 is enclosed in the coil 43. Specifically, the coil 43 is disposed outside of the outer circumferential surface of the magnet 23 with a predetermined spacing. In other words, the magnet 23 has a small diameter since the rotor 20 is disposed on the inside of the stator 40, and the main part of the rotor 20 is the magnet 23. The magnet 23 is therefore small and lightweight.

The magnetic generator of the present invention is suitable for a small general-purpose engine but can also be used in engines for vehicles or industrial machinery, and the application of the generator can be chosen freely.

In the embodiment, the magnet-supporting yoke was mounted to the hub spindle of the flywheel using a flange and bolts, but since the yoke can be mounted to the hub spindle by press fitting, riveting, or bonding, any method can be used to mount the yoke.

Further, the flywheel was the object on which the yoke was mounted, but as long as the yoke is mounted to a rotating body, any rotating body can be used.

Obviously, various minor changes and modifications of the present invention are possible in light of the above teaching. It is therefore to be understood that within the scope of the appended claims the invention may be practiced otherwise than as specifically described.

What is claimed is:

1. A magnetic generator comprising:
   a rotor having a rotary ring-shaped yoke and a ring-shaped magnet integrally mounted to an entire radially outermost circumferential surface of the yoke, the yoke including a ring-shaped flange extending away from the magnet and configured to matingly engage a stepped part of a rotating body, wherein the rotating body encompasses the rotor and only the magnet defines an outermost circumferential surface of the rotor; and
   a stator having a coil spaced a predetermined distance outwardly from an outermost circumferential surface of the magnet.

2. The generator of claim 1, wherein the generator is designed for use with a general-purpose engine, the yoke is mounted to a hub spindle of a flywheel which in turn is mounted to a crankshaft, and the coil is mounted to a crankcase.

3. The generator of claim 1, wherein the ring-shaped flange is mounted to an inner circumferential surface of the yoke, and the rotor is adapted to be mounted to the hub spindle of the rotating body via the flange.

4. The generator of claim 3, wherein the hub spindle has the stepped part configured on an end face thereof, and the rotor is fitted onto the stepped part of the hub spindle through a central hole formed in the flange.

5. The generator of claim 1, wherein the magnet is integrally mounted in advance to an outer circumferential surface of the yoke by an adhesive.

* * * * *